US011815939B2

(12) United States Patent
Hanna

(10) Patent No.: US 11,815,939 B2
(45) Date of Patent: *Nov. 14, 2023

(54) LOW COST AND LOW LATENCY LOGICAL UNIT ERASE

(71) Applicant: Lodestar Licensing Group, LLC, Evanston, IL (US)

(72) Inventor: Stephen Hanna, Fort Collins, CO (US)

(*) Notice: Subject to any disclaimer, the term of this patent is extended or adjusted under 35 U.S.C. 154(b) by 0 days.

This patent is subject to a terminal disclaimer.

(21) Appl. No.: 17/748,595

(22) Filed: May 19, 2022

(65) Prior Publication Data

US 2022/0276970 A1 Sep. 1, 2022

Related U.S. Application Data

(63) Continuation of application No. 16/227,072, filed on Dec. 20, 2018, now Pat. No. 11,347,659.

(51) Int. Cl.
*G06F 12/14* (2006.01)
*G06F 11/10* (2006.01)
(Continued)

(52) U.S. Cl.
CPC ...... *G06F 12/1408* (2013.01); *G06F 11/1004* (2013.01); *G06F 12/0246* (2013.01);
(Continued)

(58) Field of Classification Search
CPC ............. G06F 12/1408; G06F 11/1004; G06F 12/0246; G06F 12/1475; G06F 21/602;
(Continued)

(56) References Cited

U.S. PATENT DOCUMENTS 7,631,195 B1 * 12/2009 Yu ........................... G06F 21/80
713/189
11,347,659 B2 5/2022 Hanna
(Continued)

FOREIGN PATENT DOCUMENTS

CN 111354408 A 6/2020
WO WO-2012158341 A1 11/2012

OTHER PUBLICATIONS

"Chinese Application Serial No. 201911329058.X, Office Action dated Apr. 1, 2023", With English machine translation, 21 pgs.

*Primary Examiner* — Mohammad W Reza
(74) *Attorney, Agent, or Firm* — Fletcher Yoder, P.C.

(57) ABSTRACT

A memory control unit of a memory device includes at least one hardware processor; and memory storing instructions that cause the at least one hardware processor to perform operations comprising: generating a scrambler seed and a logical block address (LBA) for a block of write data received by the memory control unit from a host device; generating a flash translation layer (FTL) to map the LBA to a physical address (PA); scrambling the block of data using the scrambler seed; encrypting the scrambler seed, the LBA, and the PA in the FTL using an encryption key; initiating writing a scrambled block of data and encrypted LBA and scrambler seed to a memory array; and decrypting the FTL using an incorrect encryption key in response to an erase command received by the memory control unit from the host device.

20 Claims, 6 Drawing Sheets

(51) Int. Cl.
*G06F 21/79* (2013.01)
*H04L 9/08* (2006.01)
*G06F 12/02* (2006.01)
*G11C 16/14* (2006.01)
*G06F 21/60* (2013.01)
*H03M 13/11* (2006.01)

(52) U.S. Cl.
CPC ........ *G06F 12/1475* (2013.01); *G06F 21/602* (2013.01); *G06F 21/79* (2013.01); *G11C 16/14* (2013.01); *H03M 13/1102* (2013.01); *H04L 9/0861* (2013.01); *H04L 9/0891* (2013.01); *G06F 2212/1052* (2013.01); *G06F 2212/202* (2013.01); *G06F 2212/402* (2013.01); *G06F 2212/7201* (2013.01); *G06F 2212/7205* (2013.01)

(58) Field of Classification Search
CPC ............. G06F 21/79; G06F 2212/1052; G06F 2212/202; G06F 2212/402; G06F 2212/7201; G06F 2212/7205; G06F 11/1048; G06F 2221/2143; G11C 16/14; G11C 7/24; G11C 16/26; G11C 16/10; G11C 29/42; H03M 13/1102; H03M 13/09; H03M 13/152; H03M 13/2906; H04L 9/0861; H04L 9/0891; H04L 2209/34; H04L 9/0822

See application file for complete search history.

(56) References Cited

U.S. PATENT DOCUMENTS

| | | | | |
|---|---|---|---|---|
| 2009/0204824 | A1* | 8/2009 | Lin | G11C 16/3418 714/E11.041 |
| 2012/0278529 | A1* | 11/2012 | Hars | G06F 12/0246 711/E12.008 |
| 2013/0262880 | A1* | 10/2013 | Pong | G06F 12/1408 713/193 |
| 2020/0201785 | A1 | 6/2020 | Hanna | |

* cited by examiner

LOW COST AND LOW LATENCY LOGICAL UNIT ERASE

PRIORITY APPLICATION

This application is a continuation of U.S. application Ser. No. 16/227,072, filed Dec. 20, 2018, which is incorporated herein by reference in its entirety.

BACKGROUND

Memory devices are typically provided as internal, semiconductor, integrated circuits in computers or other electronic devices. There are many different types of memory including volatile and non-volatile memory. Volatile memory can require power to maintain data and includes random-access memory (RAM), dynamic random-access memory (DRAM), and synchronous dynamic random-access memory (SDRAM), among others. Non-volatile memory can provide persistent data by retaining stored data when not powered and can include NAND flash memory, NOR flash memory, read only memory (ROM), Electrically Erasable Programmable ROM (EEPROM), Erasable Programmable ROM (EPROM), and resistance variable memory such as phase change random access memory (PCRAM), resistive random-access memory (RRAM), and magnetoresistive random access memory (MRAM), 3D XPoint™ memory, among others.

Memory cells are typically arranged in a matrix or an array. Multiple matrices or arrays can be combined into a memory device, and multiple devices can be combined to form a storage volume of a memory system, such as a solid-state drive (SSD), a Universal Flash Storage (UFS™) device, a MultiMediaCard (MMC) solid-state storage device, an embedded MMC device (eMMC™), etc.

A memory system can include one or more processors or other memory controllers performing logic functions to operate the memory devices or interface with external systems. The memory matrices or arrays can include a number of blocks of memory cells organized into a number of physical pages. The memory system can receive commands from a host in association with memory operations, such as read or write operations to transfer data (e.g., user data and associated integrity data, such as error data and address data, etc.) between the memory devices and the host, erase operations to erase data from the memory devices, or perform one or more other memory operations.

Memory is utilized as volatile and non-volatile data storage for a wide range of electronic applications, including, for example, personal computers, portable memory sticks, digital cameras, cellular telephones, portable music players such as MP3 players, movie players, and other electronic devices. Memory cells can be arranged into arrays, with the arrays being used in memory devices.

Many electronic devices include several main components: a host processor (e.g., a central processing unit (CPU) or other main processor); main memory (e.g., one or more volatile or non-volatile memory device, such as dynamic RAM (DRAM), static RAM (SRAM), mobile or low-power double-data-rate synchronous DRAM (DDR SDRAM), etc.); and a storage device (e.g., non-volatile memory (NVM) device, such as flash memory, read-only memory (ROM), an SSD, an MMC, or other memory card structure or assembly, or combination of volatile and non-volatile memory, etc.). In certain examples, electronic devices can include a user interface (e.g., a display, touch-screen, keyboard, one or more buttons, etc.), a graphics processing unit (GPU), a power management circuit, a baseband processor or one or more transceiver circuits, etc.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Memory devices, particularly NVM devices, such as NAND flash devices, etc., can include arrays of multi-level memory cells. To program multi-level memory cells, a memory page buffer is stored with the value to be written to the memory cells. A first programming pulse is applied to the control gate of the memory cell at a voltage level that should not cause the threshold voltage of the memory cell to exceed the lowest threshold voltage of a target programmed data state of a multi-level memory cell. A read operation can then be performed to verify the threshold level to which the cell is programmed. If the cell is not programmed to the desired threshold voltage, an additional programming pulse, including optionally a higher voltage or longer length pulse, is applied and the threshold voltage is rechecked. This process is repeated until the read operation confirms that the memory cell is programmed to the desired threshold voltage.

Figure 1:
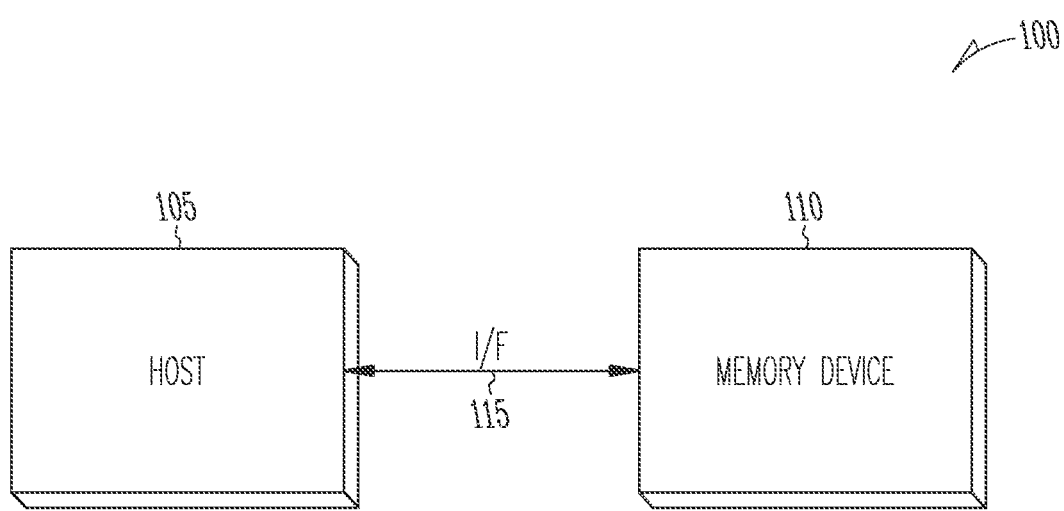
FIG. 1 illustrates an example system including a host and a memory device.

FIG. 1 illustrates an example system 100 including a host 105 and a memory device 110. The host 105 can include a host processor, a central processing unit, or one or more other device, processor, or controller. The memory device 110 can include a universal flash storage (UFS) device, an embedded MMC (eMMCT™) device, or one or more other memory devices. The host 105 and the memory device 110 can communicate using a communication interface (I/F) 115 (e.g., a bidirectional parallel or serial communication interface).

In an example, the memory device 110 can include a UFS device, and the communication interface 115 can include a serial bidirectional interface, such as defined in one or more Joint Electron Device Engineering Council (JEDEC) standards (e.g., JEDEC standard D223D (JESD223D), commonly referred to as JEDEC UFS Host Controller Interface (UFSHCI) 3.0, etc.). In another example, the memory device 110 can include an eMMCT™ device, and the communication interface 115 can include a number of parallel bidirectional data lines (e.g., DAT[7:0]) and one or more command lines, such as defined in one or more JEDEC standards (e.g., JEDEC standard D84-B51 (JESD84-A51), commonly referred to as JEDEC eMMC standard 5.1, etc.). In other examples, the memory device 110 can include one or more other memory devices, or the communication interface 115 can include one or more other interfaces, depending on the host 105 and the memory device 110. The identified standards are provided only as example environments in which the described methods and structures may be utilized; but such methods and structures may be utilized in a variety of environments outside of the identified standards (or of any actual or proposed standards).

Each of the host 105 and the memory device 110 can include a number of receiver or driver circuits configured to send or receive signals over the communication interface 115, or interface circuits, such as data control units, sampling circuits, or other intermedia circuits configured to process data to be communicated over, or otherwise process data received from the communication interface 115 for use by the host 105, the memory device 110, or one or more other circuits or devices.

The memory device 110 can include a memory array (e.g., one or more arrays of memory cells, such as a NAND flash memory array, or one or more other memory arrays), a memory control unit, and in certain examples, an interface circuit between the memory array and the memory control unit. In certain embodiments, the memory array can include a number of memory die, each having control logic separate from the memory control unit. The memory control unit can include an application specific integrated circuit (ASIC), a field programmable gate array (FPGA), or one or more other processing circuits arranged or programmed to manage data transfers or operations to, from, or within the memory array.

Figure 2:
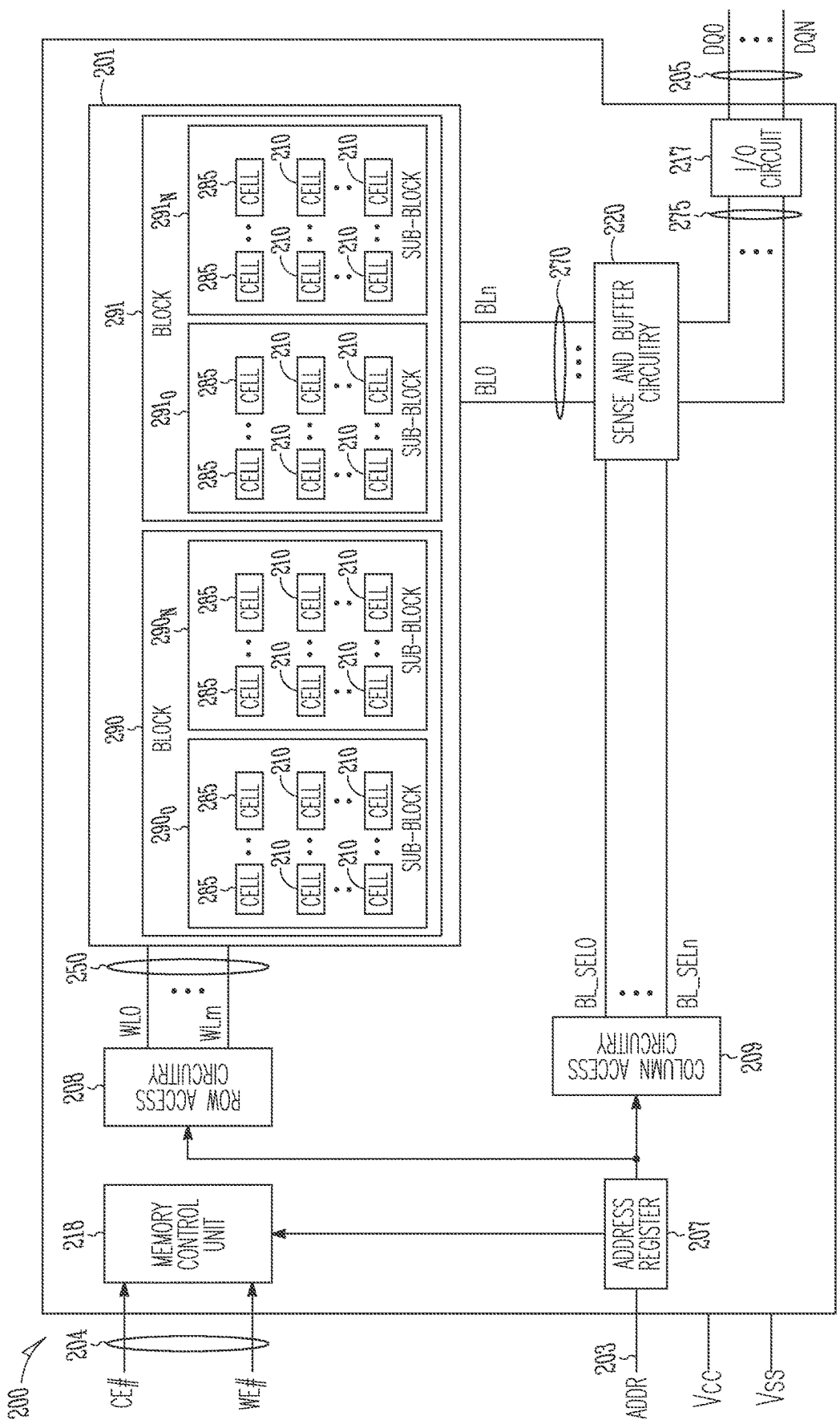
FIG. 2 is a block diagram of an apparatus in the form of a memory device including non-volatile memory cells.

FIG. 2 shows a block diagram of an apparatus in the form of a memory device 200 (e.g., memory device 110 in FIG. 1) including non-volatile memory cells having mixed memory cell types integrated in the same integrated circuit (IC) chip, according to some embodiments described herein. Memory device 200 can include a memory array (or multiple memory arrays) 201 containing memory cells 210 and 285. In the physical structure of memory device 200, memory cells 210 and 285 can be arranged vertically (e.g., stacked over each other) over a substrate of memory device 200 (e.g., a semiconductor substrate of an IC chip that includes memory device 200). Memory cells 210 and 285 can include non-volatile cells. Memory cells 210 and 285 can have different non-volatile memory cell types. For example, memory cells 210 can include floating gate memory cells, charge trap memory cells, or other types of non-volatile memory cells. Memory cells 285 can include ferroelectric memory cells, phase change memory cells, resistive memory cells, conduction bridge memory cells, and spin-transfer-torque magnetic random access memory (STT-MRAM) cells, or other types of non-volatile memory cells.

As shown in FIG. 2, memory cells 210 and 285 can be arranged in blocks (memory cell blocks), such as blocks 290 and 291. Each of blocks 290 and 291 can include sub-blocks. For example, block 290 can include sub-blocks $290_0$ and $290_n$, and block 291 can include sub-blocks $291_0$ and $291_n$. Each of sub-blocks $290_0$, $290_n$, $291_0$, and $291_n$ can include a combination of memory cells 210 and 285. FIG. 2 shows memory device 200 having two blocks 290 and 291 and two sub-blocks in each of the blocks as an example. Memory device 200 can have more than two blocks and more than two sub-blocks in each of the blocks.

As shown in FIG. 2, memory device 200 can include access lines (which can include word lines) 250 and data lines (which can include bit lines) 270. Access lines 250 can carry signals (e.g., word line signals) WL0 through WLm. Data lines 270 can carry signals (e.g., bit line signals) BL0 through BLn. Memory device 200 can use access lines 250 to selectively access sub-blocks $290_0$, $290_n$, $291_0$, and $291_n$ of blocks 290 and 291 and data lines 270 to selectively exchange information (e.g., data) with memory cells 210 of blocks 290 and 291.

Memory device 200 can include an address register 207 to receive address information (e.g., address signals) ADDR on lines (e.g., address lines) 203. Memory device 200 can include row access circuitry 208 and column access circuitry 209 that can decode address information from address register 207. Based on decoded address information, memory device 200 can determine which memory cells 210 of which sub-blocks of blocks 290 and 291 are to be accessed during a memory operation. Memory device 200 can perform a read operation to read (e.g., sense) information (e.g., previously stored information) in memory cells 210, or a write (e.g., program) operation to store (e.g., program) information in memory cells 210. Memory device 200 can use data lines 270 associated with signals BL0 through BLn to provide information to be stored in memory cells 210 or obtain information read (e.g., sensed) from memory cells 210. Memory device 200 can also perform an erase operation to erase information from some or all of memory cells 210 of blocks 290 and 291.

Memory device 200 can include a memory control unit 218 (which can include components such as a state machine (e.g., finite state machine), register circuits, and other components) configured to control memory operations (e.g., read, write, and erase operations) of memory device 200 based on control signals on lines 204. Examples of the control signals on lines 204 include one or more clock signals and other signals (e.g., a chip enable signal CE #, a write enable signal WE #) to indicate which operation (e.g., read, write, or erase operation) memory device 200 can perform.

Memory device 200 can include sense and buffer circuitry 220 that can include components such as sense amplifiers and page buffer circuits (e.g., data latches). Sense and buffer circuitry 220 can respond to signals BL_SEL0 through BL_SELn from column access circuitry 209. Sense and buffer circuitry 220 can be configured to determine (e.g., by sensing) the value of information read from memory cells 210 (e.g., during a read operation) of blocks 290 and 291 and provide the value of the information to lines (e.g., global data lines) 275. Sense and buffer circuitry 220 can also can be configured to use signals on lines 275 to determine the value of information to be stored (e.g., programmed) in memory cells 210 of blocks 290 and 291 (e.g., during a write operation) based on the values (e.g., voltage values) of signals on lines 275 (e.g., during a write operation).

Memory device 200 can include input/output (I/O) circuitry 217 to exchange information between memory cells 210 of blocks 290 and 291 and lines (e.g., I/O lines) 205. Signals DQ0 through DQN on lines 205 can represent information read from or stored in memory cells 210 of blocks 290 and 291. Lines 205 can include nodes within memory device 200 or pins (or solder balls) on a package where memory device 200 can reside. Other devices external to memory device 200 (e.g., a memory controller, memory control unit, or a processor) can communicate with memory device 200 through lines 203, 204, and 205.

Memory device 200 can receive a supply voltage, including supply voltages Vcc and Vss. Supply voltage Vss can operate at a ground potential (e.g., having a value of approximately zero volts). Supply voltage Vcc can include an external voltage supplied to memory device 200 from an external power source such as a battery or alternating current to direct current (AC-DC) converter circuitry.

Each of memory cells 210 can be programmed individually or collectively to one or a number of programmed states. For example, a single-level cell (SLC) can represent one of two programmed states (e.g., 1 or 0), representing one bit of data. However, flash memory cells can also represent one of more than two programmed states, allowing the manufacture of higher density memories without increasing the number of memory cells, as each cell can represent more than one binary digit (e.g., more than one bit). Such cells can be referred to as multi-state memory cells, multi-digit cells, or multi-level cells (MLCs). In certain examples, MLC can refer to a memory cell that can store two bits of data per cell (e.g., one of four programmed states), a triple-level cell (TLC) can refer to a memory cell that can store three bits of data per cell (e.g., one of eight programmed states), and a quad-level cell (QLC) can store four bits of data per cell. MLC is used herein in its broader context, to refer to any memory cell that can store more than one bit of data per cell (i.e., that can represent more than two programmed states).

In another example, each of memory cells 210 can be programmed to store information representing a value for multiple bits, such as one of four possible values "00", "01", "10", and "11" of two bits, one of eight possible values "000", "001", "010", "011", "100", "101", "110", and "111" of three bits, or one of other values of another number of multiple bits. A cell that has the ability to store multiple bits is sometimes called a multi-level cell (or multi-state cell).

Memory device 200 can include a non-volatile memory device, such that memory cells 210 and 285 can retain information stored thereon when power (e.g., voltage Vcc, Vss, or both) is disconnected from memory device 200. For example, memory device 200 can be a flash memory device, such as a NAND flash (e.g., 3-dimensional (3-D) NAND) or a NOR flash memory device, or another kind of memory device, such as a variable resistance memory device (e.g., a phase change memory device or a resistive RAM (Random Access Memory) device). One of ordinary skill in the art may recognize that memory device 200 may include other components not shown in FIG. 2 so as not to obscure the example embodiments described herein.

For an erase operation it is desirable to quickly and securely erase memory. This is especially true in mobile devices, and as for all mobile operations, the erase operation should be accomplished while meeting challenging power and resource restrictions. An erase operation may have specific requirements to guarantee that the data is un-recoverable from the host. For example, the memory control unit 218 may map virtual memory addresses to the physical memory cells of the memory array (e.g., using logical to physical or L2P tables). A universal flash storage (UFS) secure erase moves data from the mapped memory address space to the unmapped memory address space. In a conventional approach, the regions in the mapped address space where the erase was applied are set to the erased value of zero. After an erase is executed, software on the host should not be able to retrieve the erased data. The erase operation places no specific time requirement on the physical destruction of the data, and the erase operation can be a lengthy process.

Figure 3:
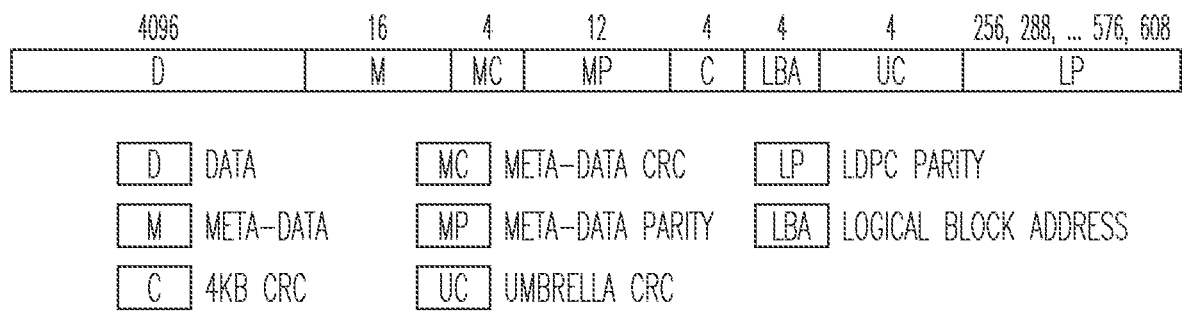
FIG. 3 is an illustration of a format of memory data written to memory.

FIG. 3 is an illustration of a format of memory data written to memory (e.g., NAND Flash memory). The memory array can include multiple logical units or LUNs (e.g., 32 LUNs) that each include multiple four kilobytes (4 KB) blocks of data. Every 4 KB of data (D) is written with meta-data (M). The memory data can also include cyclic redundancy code (CRC) data for the 4 KB (C), CRC for the meta-data (MC), parity of the meta-data (MP), a Logical Block Address (LBA), an umbrella CRC (UC), and a low-density parity check code (LDPC). The LBA enables the memory control unit to recover the data when it is read by the Host or recycled by Garbage Collecting (GC) or by an asynchronous power loss (APL) recovery. Mobile NAND memory controllers can include an 8 Byte Block Encryption Engine to support UFS 3.1 Host Performance Boost (HPB) features. The LBA and 4 KB CRC are encrypted before being written to memory. Before a 4 KB block can be transferred to the Host when read or recycled by GC or APL, the LBA and 4 KB CRC are decrypted using the encryption key and verified.

For an erase operation, the encryption key is changed. Any data encrypted and written with the old encryption key will not be decrypted correctly with the new encryption key. The verification of LBAs and CRCs encrypted with the old key will fail. When the verification fails, the memory control unit may send all zeros data back to the host requesting the read data after the erase operation. The result is that the host receives all zeros for the read operation as if the data in the memory was physically erased to contain zeros.

The user data may still reside in memory because it was not actually physically erased. Over time the data will be overwritten, but prior to a garbage collection operation, the user data could still be read. As explained previously herein, the memory control unit 218 may map virtual memory addresses (LBAs) to the physical memory cells or physical addresses (PAs). An additional level of erase protection can be realized by encrypting the LBA to PA Map using the encryption key. When the encryption key is changed, the Map is no longer valid. When the host tries to read an LBA, the LBA and CRC verification will fail and the "erased" Map will not produce correct data from physical address. The Map may provide translation for addresses for entire LUN. Erasing the Map will require a new Map for the LUN to be built.

A further level of erase protection can be realized by scrambling the data before it is written using a scrambler seed, such as a random number for example. Each block of data may be provided a unique scrambler seed. After the data is scrambled, the scrambler seed is protected with encryption and the encrypted scrambler seed is written with the scrambled data. The 4 KB CRC can be scrambled and written as well instead of being encrypted. The LBA and the scrambler seed are decrypted when the data is read, and the data is descrambled and verified before the data is sent to the host. When the encryption key is changed as part of an erase operation, the scrambler seed is lost, the data will not descramble correctly, and the data verification will fail. Encrypting the scrambler seed has the advantage of obfuscating the user data while still corrupting the CRC Signature to affect the erase function when the encryption key is changed.

Figure 4:
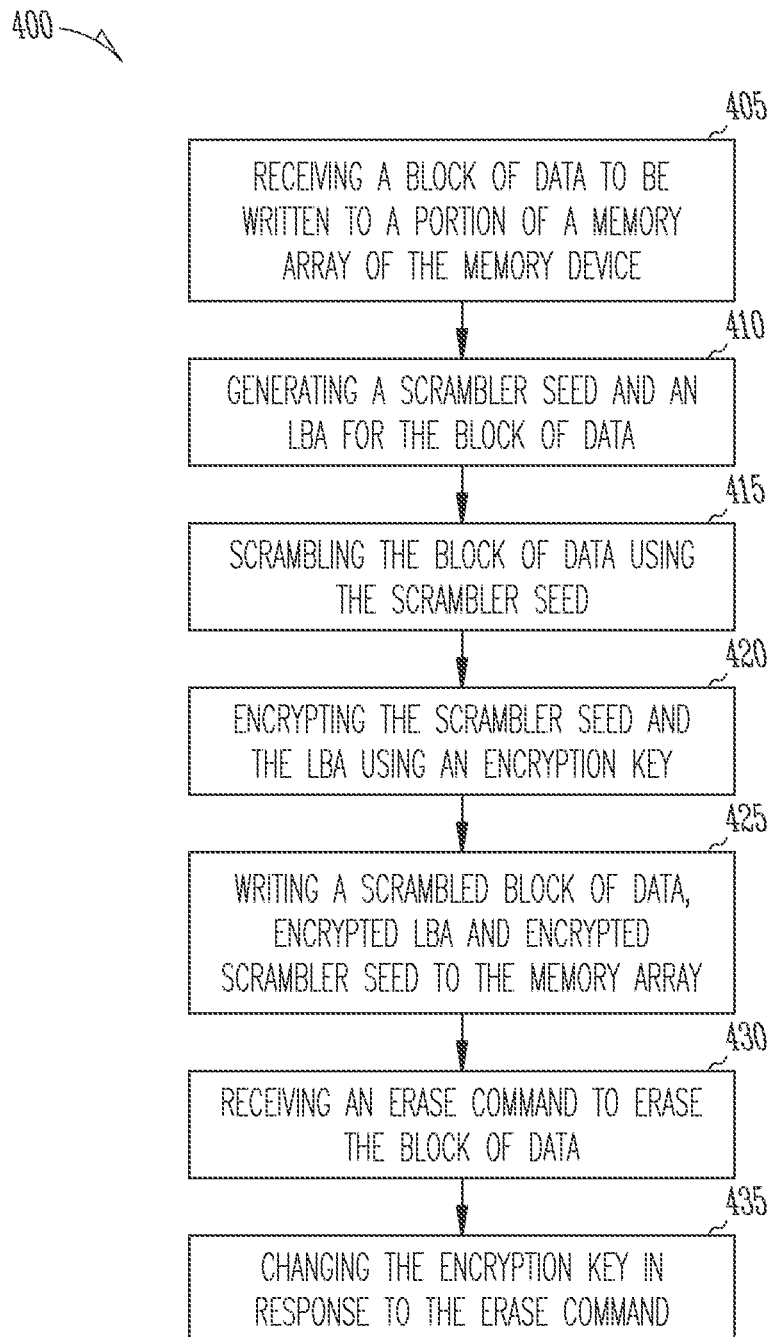
FIG. 4 is a flow diagram of a method of operating a memory device to perform an erase operation.

FIG. 4 is a flow diagram of a method 400 of operating a memory device to perform an erase operation. The memory device may be the memory device of FIG. 2. The memory device includes a memory array of memory cells. The memory cells may be NAND Flash memory cells. The method quickly erases a block of memory (e.g., an LUN) by changing an encryption key used to encrypt one or more critical embedded Meta-Data fields and the L2P Maps or tables. If the Meta-Data fields and the L2P Maps are encrypted and the encryption key changes between encryption and decryption, then the Meta-Data is not recoverable and the verification of the LBA, the user data, and the CRC data will fail.

At 405, a block of data (e.g., a 4 KB block) to be written to a portion of a memory array of the memory device is received at the memory device. At 410, an LBA is generated for the block of data. The LBA of the data block may be tracked using an L2P Map or table. A scrambler seed is also generated. At 415, the block of data is scrambled using the scrambler seed before the data is written. In certain aspects, the scrambler seed is a random number generated by the memory control unit. In certain aspects, the scrambler seed includes both a random number and a known quantity, such as a memory page number for example.

At 420, the scrambler seed and the LBA are encrypted using an encryption key. In certain aspects the encryption key is generated by the memory control unit, and in certain aspects the encryption is received by the memory control unit from another portion of the memory device or from a separate device. The encryption of the scrambler seed may be performed in parallel with the scrambling of the data. At 425, the scrambled block of data, the encrypted LBA, and the encrypted scrambler seed are written to the memory array. The encrypted LBA and scrambler seed can be written in association with the scrambled block of data.

At 425, an erase command is received by the memory device to erase the block of data written to memory. At 430, the encryption key used to encrypt the LBA and scrambler seed is changed in response to receiving the erase command. When a host subsequently tries to access the erased data using a read command, the LBA and scrambler seed will not decrypt correctly. Because the scrambler seed is incorrect, the block of data will not descramble correctly, and access to the data will fail.

In some aspects, the memory device creates a Flash Translation Layer (FTL) that maps LBAs to physical addresses (PAs). The FTL Map may include one or more L2P tables and the Map may be encrypted. A Map can be created for each LUN. The FTL would use less than one percent of the device user capacity so that the encryption bandwidth to support encryption of the Map is minimal. For Write operations, the PA for an LBA is updated and encrypted in a Map prior to storing in the memory array. For Read operations, the PA is accessed from the Map and decrypted to fetch the correct data from the memory array. Thus, accessing the Map of L2P addresses is dependent on decryption using the correct encryption key. When the encryption key is changed by an erase operation, logical recovery of the data is impossible because the LUN Map containing the PAs is encrypted with the previous key. Recovery of the physical data (e.g., by a physical read of the whole LUN) is impossible because the LBA (that identifies the data) and data scrambler seed are encrypted with the previous key.

Attempting to access data by decrypting with the changed encryption key will generate a fault in the memory device. The memory device may return the faulty data to the host with a notice of the fault, or the memory device may return all-zeros data to the host. The changing of the encryption key will execute much faster than erasing the block of memory and the erase operation is performed with reduced latency.

Figure 5:
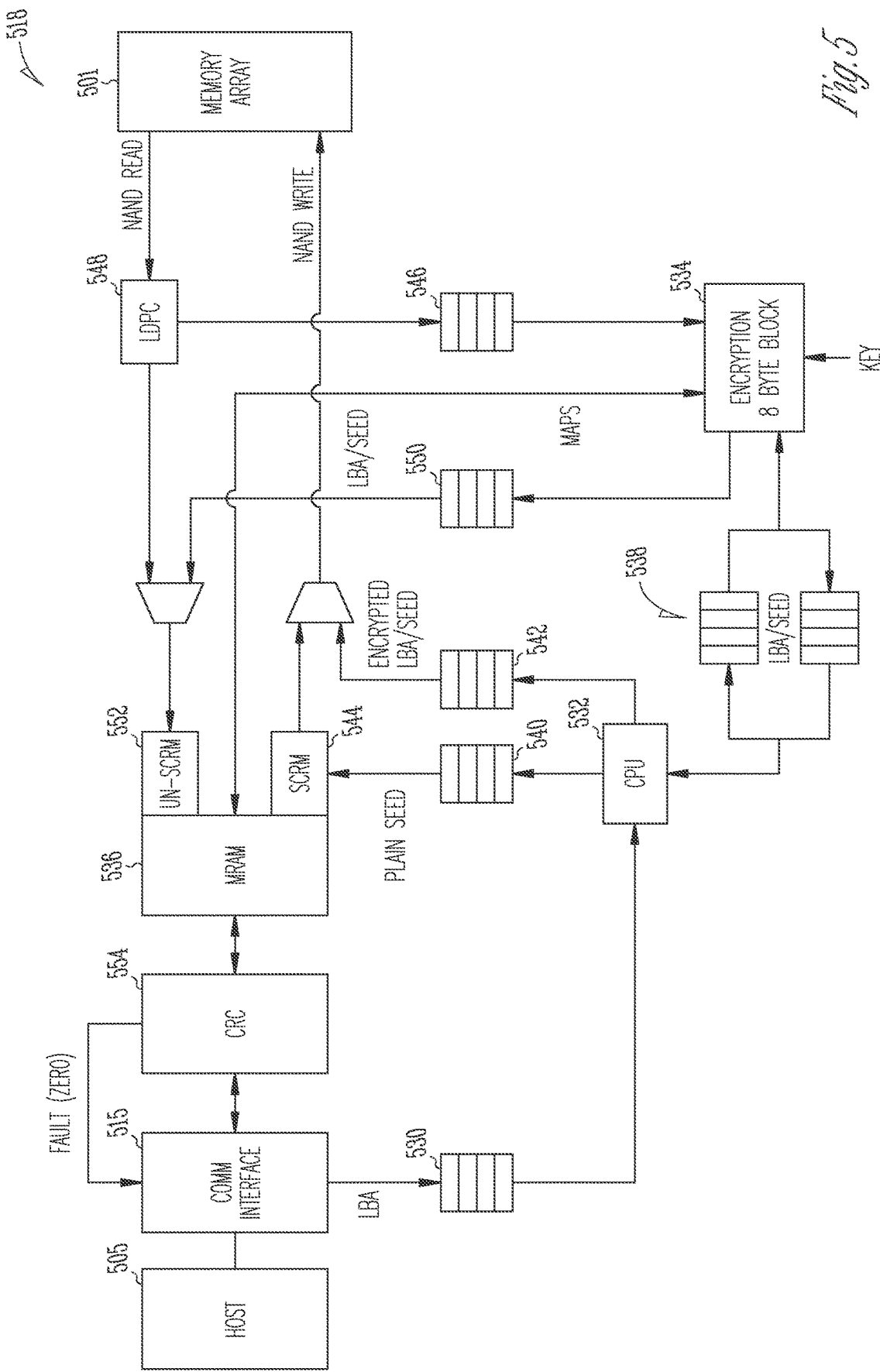
FIG. 5 is a block diagram illustrating flow of encryption and decryption in a memory control unit of a memory device.

FIG. 5 is a block diagram illustrating flow of encryption and decryption in a memory control unit of a memory device. The memory control unit 518 may be the memory control unit 218 of the memory device of FIG. 2. The memory control unit 518 communicates with a host 505 using a communication interface 515. The host 505 may be a host device or a host application. The host transfers a block of data (e.g., data block D in FIG. 3) to the memory device for writing to memory (e.g., a memory array of the memory device).

The memory control unit 518 generates an LBA for the data block. In certain aspects, the memory control unit creates a list of LBAs 530 for 4 KB blocks to be written to the memory. The LBAs are associated to PAs. The memory control unit 518 may include mapping circuitry to generate the list of LBAs. The mapping circuitry may be included in a central processing unit (CPU) 532. The LBAs may be recorded in a Map of logical to physical (L2P) addresses or an L2P table. The Map can be included in an FTL. The memory control unit 518 also generates a scrambler seed for the data block. The scrambler seed may be generated by CPU 532. LBA/Seed pairs are generated for the data blocks written to memory.

The memory control unit 518 encrypts the pairs of LBAs and scrambler seeds. In certain aspects, the CPU 532 includes firmware or software to perform encryption. In certain aspects, the memory control unit 518 includes an encryption/decryption engine 534. An "engine" refers to a block of logic circuitry of the memory control unit 518 dedicated to performing encryption functions. The encryption engine 534 may be configured to encrypt data using a symmetric key encryption such as Advanced Encryption Standard (AES). In some embodiments, the encryption engine 534 encrypts the data on the fly using a content encryption key (CEK).

While the user data for writing is accumulated and staged in main memory 536 of the memory control unit, the CPU submits LBA/Seed pairs to the encryption/decryption engine 534. In this way, the encryption/decryption of data is deterministic in that the number of clock cycles needed to encrypt data is always the same and doesn't vary with the load on other circuitry (e.g., CPU 532) of the memory control unit 518. The memory control unit 518 may include one or more queues 538 to provide LBA/Seed pairs to the encryption engine and receive encrypted LBA/Seed pairs for each of the data blocks from the encryption engine.

The memory control unit 518 can include a scrambling queue 540 for storing unencrypted, or plain text, seeds and an encryption queue 542 for storing encrypted LBA/Seed pairs. The CPU 532 queues unencrypted seeds and encrypted LBA/Seed pairs. The unencrypted seeds are provided to scrambler engine 544 to scramble the user data accumulated in the main memory 536 of the memory control unit. To scramble the data, the scrambler engine 544 may include a linear feedback shift register (LFSR). The LFSR (not shown) may include exclusive-or (XOR) logic in the feedback. The LFSR is pre-set with the scrambler seed and the block of data may be shifted through the LFSR to generate the scrambled data. The process is reversed to descramble the block of data. The encryption method (e.g., AES or CEK) may start with a random number but may include, among other things, bit transposition, bit replacements, and bit XOR operations. Thus, the scrambler seeds are provided a high level of security.

The data (D) and CRC data (C) in FIG. 3 are scrambled. One or more of the other Meta-Data fields of the data may be scrambled as well. The memory control unit 518 then initiates writing the scrambled block of data to the memory array in association with the encrypted LBA and encrypted scrambler seed. The memory control unit may include logic circuitry dedicated for writing the memory array (e.g., Flash control circuitry). When the scrambled data is ready to be written to the memory array, the CPU 532 will swap the non-encrypted LBAs and scrambler seeds in the data stream on the fly with the encrypted LBAs and scrambler seeds. The CPU 532 can reorder the LBA/Seed pairs to match the LBA order written to the main memory 536 of the memory control unit. The Map or table of LBAs for an LUN can be encrypted and stored in the memory.

The keys used for encryption may be generated by the memory control unit using a Deterministic Random Number Generator (DRNG) or the keys can be received from a separate unit or device. Keys may be wrapped and stored in the memory array between power cycles. The encryption key is stored in association with the block of data or blocks of data of an LUN. In response to an erase command or other indication of an erase operation, the stored encryption key is overwritten with a new encryption key. The stored data is unmodified, and the new encryption key is the wrong key for decrypting the stored data. Once the old key is overwritten and lost, the CPU 532 will be unable to recover the data by any recovery method.

To read un-erased data from the memory array, such as in response to a read request from the host for example, the process is reversed. The memory control unit 518 initiates reading the scrambled block of data, the encrypted LBA, and the encrypted scrambler seed from the memory array. The memory control unit 518 creates a list of encrypted LBAs and encrypted scrambler seeds for data read from memory. The memory control unit 518 may include a decryption queue 546 to store the list of encrypted LBA/Seed pairs for decryption by the encryption/decryption engine 534.

The block of scrambled read data may be parity checked before descrambling. In some aspects, the memory control unit 518 may include parity check circuitry that performs a low-density parity check (LDPC) on the scrambled data. To hide the decrypt latency on the time sensitive read path, the encrypted LBA and Scrambler Seed for a block of data can be decrypted in parallel with the LDPC correction of the scrambled block of data and released when the LDPC confirms the validity of the data. In certain aspects, the LBA and scrambler seed are corrected using Bose, Chaudhuri and Hocquenghem (BCH) coding prior to decryption.

The encrypted LBA/Seed pairs are replaced with decrypted LBA/Seed pairs prior to descrambling. The memory control unit 518 may include a buffer 550 to manage any time difference between the decrypting and the parity checking. The scrambled block of data read from memory is descrambled using the decrypted scrambler seed to generate read data for the read operation. In some aspects, the memory control unit 518 includes a descrambler engine 552 that descrambles the read data blocks using the decrypted scrambling seeds.

The memory control unit includes CRC circuitry 554 to determine CRC data for the read data before sending the read data to the host. In certain aspects, the CRC data is correct when the CRC data matches the LBA address. The read data is transferred to the host via the communication interface 515 when the read data passes the CRC check. In certain aspects, the CRC circuitry 554 generates the CRC data that is scrambled using the same scrambler seed as that used to scramble the write data. The scrambled CRC data is read out with the block of data and descrambled. The read data is sent to the host when the descrambled CRC data is correct (e.g., the descrambled CRC data matches the CRC data determined for the block of read data).

When data is read after an erase operation, the encryption key was changed between the writing of the encrypted LBA and scrambler seed. The encryption/decryption engine 534 decrypts the LBA/Seed pairs using the changed encryption key. This results in the decrypted LBA and decrypted scrambler seed being incorrect. The descrambler engine 552 descrambles the scrambled block of data using the incorrect scrambler seed and generates incorrect read data. The memory control unit 518 detects the incorrect read data and communicates a fault to the host via the communication interface. In certain aspects, the memory control unit 518 sends all zeros data to the host device to communicate the fault. In certain aspects, the memory control unit 518 transmits a fault signal to the host device and the host device uses all zeros data instead of read data transferred from the memory control unit 518 in response to the fault signal.

The memory control unit 518 may detect the incorrect read data when the CRC data generated for the read data is incorrect. In certain aspects, the memory control unit determines that the read data is incorrect when the CRC data generated for the read data does not match the CRC data for the data block that was scrambled, written, read, and descrambled. In certain aspects, the LBA determined for a block of data written to memory matches its CRC data. The memory control unit 518 determines that the read data is incorrect when the CRC data generated for the read data does not match the LBA. If other Meta-Data fields for the block of data are scrambled, the Meta-Data will also be incorrect. In response to the mismatch, the memory control unit 518 communicates a fault or all-zeros data via the communication interface.

As explained previously herein, the memory control unit may generate a map in an FTL to map the LBAs to PAs. If the PAs in the FTL are encrypted using the same encryption key used to encrypt the LBAs and scrambler seeds, the read data for the PAs is not recoverable when the encryption key is changed. If the Map tracks the PAs and LBAs for the entire LUN, changing the encryption key effectively erases the all the data for LUN. The Map for the LUN subsequently needs to be built back up.

The described erase operation that changes the encryption key instead of physically erasing the memory cells improves speed of erase operations without requiring higher bandwidth, increased circuit area, and increased circuit power of the encryption circuitry. The described methods of logical erasure instead of physical erasure meets the definition of UFS erase operation that prohibit host access to the data or host recovery of the data. The physical erasure of the data has no time requirement under UFS and can the physical erasure process can be lengthy. Mobile NAND controller typically already include an encryption to support UFS 3.1 host performance boost (HPB) features and the additional circuitry to implement the erase methods described herein is minimal.

Figure 6:
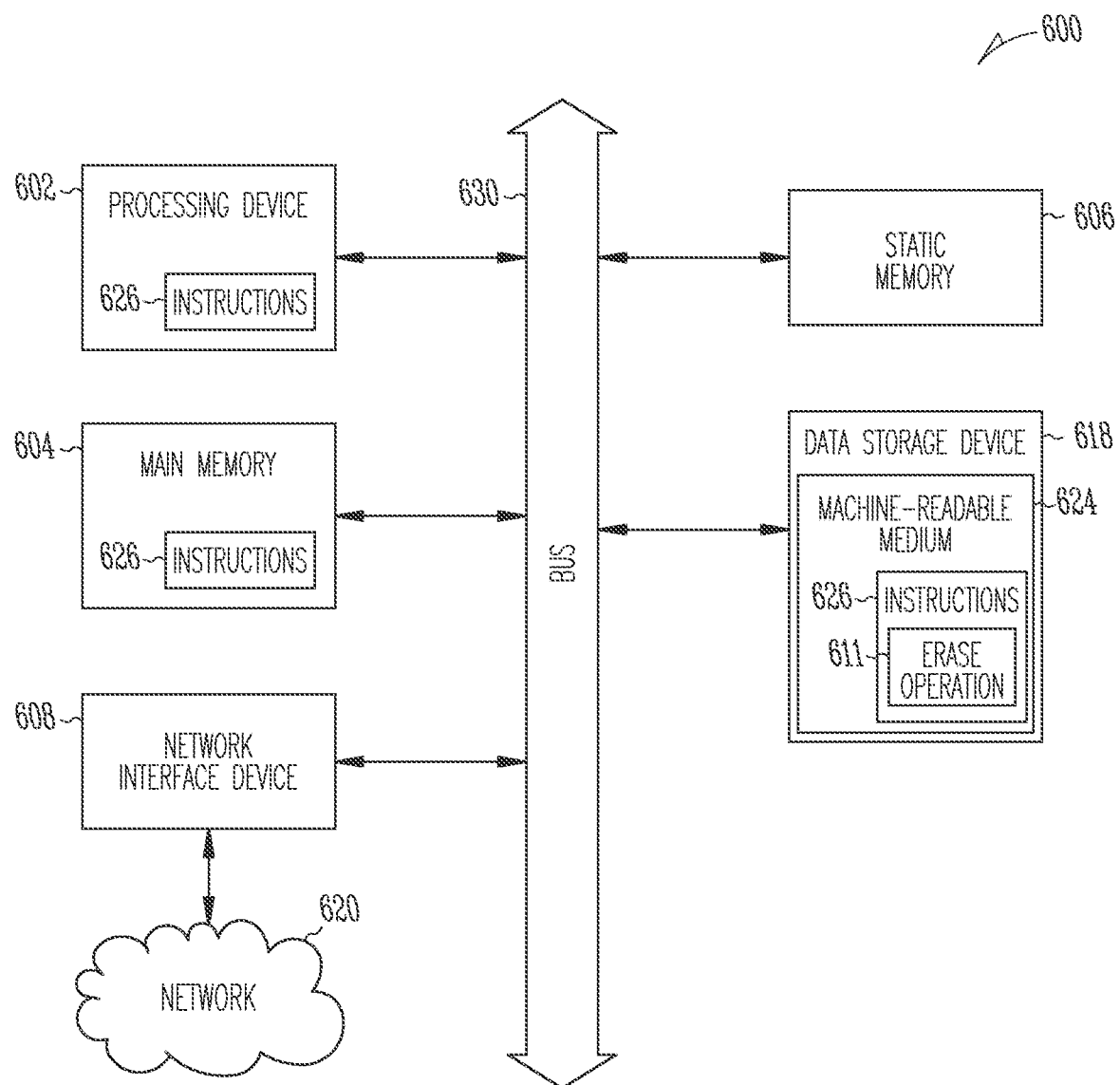
FIG. 6 illustrates a block diagram of an example machine according to some embodiments described herein.

FIG. 6 illustrates a block diagram of an example machine 600 upon which any one or more of the techniques (e.g., methodologies) discussed herein may perform, such as the described erase operations for example. In alternative embodiments, the machine 600 may operate as a standalone device or may be connected (e.g., networked) to other machines. In a networked deployment, the machine 600 may operate in the capacity of a server machine, a client machine, or both in server-client network environments. In an example, the machine 600 may act as a peer machine in peer-to-peer (P2P) (or other distributed) network environment. The machine 600 may be a personal computer (PC), a tablet PC, a set-top box (STB), a personal digital assistant (PDA), a mobile telephone, a web appliance, an IoT device, automotive system, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

The embodiments and examples, as described herein, may include, or may operate by, logic, components, devices, packages, or mechanisms. Circuitry is a collection (e.g., set) of circuits implemented in tangible entities that include hardware (e.g., simple circuits, gates, logic, etc.). Circuitry membership may be flexible over time and underlying hardware variability. Circuitries include members that may, alone or in combination, perform specific tasks when operating. In an example, hardware of the circuitry may be immutably designed to carry out a specific operation (e.g., hardwired). In an example, the hardware of the circuitry may include variably connected physical components (e.g., execution units, transistors, simple circuits, etc.) including a computer-readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable participating hardware (e.g., the execution units or a loading mechanism) to create members of the circuitry in hardware via the variable connections to carry out portions of the specific tasks when in operation. Accordingly, the computer-readable medium is communicatively coupled to the other components of the circuitry when the device is operating. In an example, any of the physical components may be used in more than one member of more than one circuitry. For example, under operation, execution units may be used in a first circuit of a first circuitry at one point in time and reused by a second circuit in the first circuitry, or by a third circuit in a second circuitry at a different time.

The machine (e.g., computer system) 600 (e.g., the host 105, the memory device 110 of FIG. 1, etc.) may include a processing device 602 (e.g., a hardware processor, a central processing unit (CPU), a graphics processing unit (GPU), a hardware processor core, or any combination thereof, such as a memory control unit of the memory device 110, etc.), a main memory 604 (e.g., read-only memory (ROM), flash memory, dynamic random-access memory (DRAM) such as synchronous DRAM (SDRAM) or Rambus DRAM (RDRAM), etc.), a static memory 606 (e.g., flash memory, static random-access memory (SRAM), etc.), and a data storage system 618, some or all of which may communicate with each other via an interlink (e.g., bus) 630.

The processing device 602 can represent one or more general-purpose processing devices such as a microprocessor, a central processing unit, or the like. More particularly, the processing device 602 can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. The processing device 602 can also be one or more special-purpose processing devices such as an application specific integrated circuit (ASIC), a field programmable gate array (FPGA), a digital signal processor (DSP), network processor, or the like. The processing device 602 can be configured to execute instructions 626 for performing the operations and steps discussed herein. The machine 600 can further include a network interface device 608 to communicate over a network 620.

The data storage system 618 can include a machine-readable storage medium 624 (also known as a computer-readable medium) on which is stored one or more sets of instructions 626 or software embodying any one or more of the methodologies or functions described herein. The instructions 626 can also reside, completely or at least partially, within the main memory 604 or within the processing device 602 during execution thereof by the machine 600, the main memory 604 and the processing device 602 also constituting machine-readable storage media. The machine-readable storage medium 624, the data storage system 618, or the main memory 604 can correspond to the memory device 110 of FIG. 1. In one implementation, the instructions 626 include instructions 611 to implement functionality corresponding to an erase operation (e.g., the erase operation of FIG. 4).

While the machine-readable storage medium 624 is shown in an example implementation to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media. In an example, a massed machine-readable medium comprises a machine-readable medium with a plurality of particles having invariant (e.g., rest) mass. Accordingly, massed machine-readable media are not transitory propagating signals. Specific examples of massed machine-readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The machine 600 may further include a display unit, an alphanumeric input device (e.g., a keyboard), and a user interface (UI) navigation device (e.g., a mouse). In an example, one or more of the display unit, the input device, or the UI navigation device may be a touch screen display. The machine a signal generation device (e.g., a speaker), or one or more sensors, such as a global positioning system (GPS) sensor, compass, accelerometer, or one or more other sensor. The machine 600 may include an output controller, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The instructions 626 (e.g., software, programs, an operating system (OS), etc.) or other data are stored on the data storage device 618 can be accessed by the main memory 604 for use by the processing device 602. The main memory 604 (e.g., DRAM) is typically fast, but volatile, and thus a different type of storage than the data storage device 618 (e.g., an SSD), which is suitable for long-term storage, including while in an "off" condition. The instructions 626 or data in use by a user or the machine 600 are typically loaded in the main memory 604 for use by the processing device 602. When the main memory 604 is full, virtual space from the data storage device 618 can be allocated to supplement the main memory 604; however, because the data storage device 618 device is typically slower than the main memory 604, and write speeds are typically at least twice as slow as read speeds, use of virtual memory can greatly reduce user experience due to storage device latency (in contrast to the main memory 604, e.g., DRAM). Further, use of the data storage device 618 for virtual memory can greatly reduce the usable lifespan of the data storage device 618.

In contrast to virtual memory, virtual memory compression (e.g., the Linux™ kernel feature "ZRAM") uses part of the memory as compressed block storage to avoid paging to the data storage device 618. Paging takes place in the compressed block until it is necessary to write such data to the data storage device 618. Virtual memory compression increases the usable size of the main memory 604, while reducing wear on the data storage device 618.

Storage devices optimized for mobile electronic devices, or mobile storage, traditionally include MMC solid-state storage devices (e.g., micro Secure Digital (microSD™) cards, etc.). MMC devices include a number of parallel interfaces (e.g., an 8-bit parallel interface) with a host (e.g., a host device), and are often removable and separate components from the host. In contrast, eMMC™ devices are attached to a circuit board and considered a component of the host, with read speeds that rival serial ATA™ (Serial AT (Advanced Technology) Attachment, or SATA) based SSD devices. However, demand for mobile device performance continues to increase, such as to fully enable virtual or augmented-reality devices, utilize increasing networks speeds, etc. In response to this demand, storage devices have shifted from parallel to serial communication interfaces. Universal Flash Storage (UFS) devices, including controllers and firmware, communicate with a host using a low-voltage differential signaling (LVDS) serial interface with dedicated read/write paths, further advancing greater read/write speeds.

The instructions 624 may further be transmitted or received over a network 620 using a transmission medium via the network interface device 608 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, peer-to-peer (P2P) networks, among others. In an example, the network interface device 608 may include one or more physical jacks (e.g., Ethernet, coaxial, or phone jacks) or one or more antennas to connect to the network 620. In an example, the network interface device 608 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding, or carrying instructions for execution by the machine 600, and includes digital or analog communications signals or other intangible medium to facilitate communication of such software.

The above detailed description includes references to the accompanying drawings, which form a part of the detailed description. The drawings show, by way of illustration, specific embodiments in which the invention can be practiced. These embodiments are also referred to herein as "examples". Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In this document, the terms "a" or "an" are used, as is common in patent documents, to include one or more than one, independent of any other instances or usages of "at least one" or "one or more." In this document, unless stated otherwise the term "or" is used to refer to a nonexclusive or, such that "A or B" may include "A but not B," "B but not A," and "A and B," unless otherwise indicated. In the appended claims, the terms "including" and "in which" are used as the plain-English equivalents of the respective terms "comprising" and "wherein". Also, in the following claims, the terms "including" and "comprising" are open-ended. A system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

In various examples, the components, controllers, processors, units, engines, or tables described herein can include, among other things, physical circuitry or firmware stored on a physical device. As used herein, "processor" means any type of computational circuit such as, but not limited to, a microprocessor, a microcontroller, a graphics processor, a digital signal processor (DSP), or any other type of processor or processing circuit, including a group of processors or multi-core devices.

Operating a memory cell, as used herein, includes reading from, writing to, or erasing the memory cell. The operation of placing a memory cell in an intended state is referred to herein as "programming," and can include both writing to or erasing from the memory cell (e.g., the memory cell may be programmed to an erased state).

According to one or more embodiments of the present disclosure, a memory controller (e.g., a processor, controller, firmware, etc.) located internal or external to a memory device, is capable of determining (e.g., selecting, setting, adjusting, computing, changing, clearing, communicating, adapting, deriving, defining, utilizing, modifying, applying, etc.) a quantity of wear cycles, or a wear state (e.g., recording wear cycles, counting operations of the memory device as they occur, tracking the operations of the memory device it initiates, evaluating the memory device characteristics corresponding to a wear state, etc.)

According to one or more embodiments of the present disclosure, a memory access device may be configured to provide wear cycle information to the memory device with each memory operation. The memory device control circuitry (e.g., control logic) may be programmed to compensate for memory device performance changes corresponding to the wear cycle information. The memory device may receive the wear cycle information and determine one or more operating parameters (e.g., a value, characteristic) in response to the wear cycle information.

Method examples described herein can be machine, device, or computer-implemented at least in part. Some examples can include a computer-readable medium, a device-readable medium, or a machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, the code can be tangibly stored on one or more volatile or non-volatile tangible computer-readable media, such as during execution or at other times. Examples of these tangible computer-readable media can include, but are not limited to, hard disks, removable magnetic disks, removable optical disks (e.g., compact discs and digital video disks), magnetic cassettes, memory cards or sticks, random access memories (RAMS), read only memories (ROMs), solid state drives (SSDs), Universal Flash Storage (UFS) device, embedded MMC (eMMC) device, and the like.

ADDITIONAL DESCRIPTION AND EXAMPLES

Example 1 includes subject matter (such as a memory device) comprising a memory array including memory cells; a communication interface; and a memory control unit operatively coupled to the memory array and the communication interface. The memory control unit is configured to: generate a scrambler seed and a logical block address (LBA) for a block of write data received via the communication interface; scramble the block of data using the scrambler seed; encrypt the scrambler seed and the LBA using an encryption key; initiate writing a scrambled block of data and encrypted LBA and scrambler seed to the memory array; and change the encryption key in response to an erase command received via the communication interface.

In Example 2, the subject matter of Example 1 optionally includes a memory control unit configured to: generate the encryption key for the block of data; initiate storing of the encryption key in association with the block of data; and overwrite the stored encryption key with a new encryption key in response to the erase command.

In Example 3, the subject matter of one or both of Examples 1 and 2 optionally include a scrambling queue for storing unencrypted scrambler seed and data block pairs for scrambling blocks of data; and an encryption queue for storing LBA and scrambler seed pairs for encryption, wherein queued data blocks are scrambled in parallel with encryption of queued LBAs and scrambler seeds of the data blocks.

In Example 4, the subject matter of one or any combination of Examples 1-3 optionally includes a memory control unit configured to initiate reading the scrambled block of data and encrypted LBA and scrambler seed from the memory array; decrypt the read encrypted LBA and scrambler seed; descramble the scrambled block of data using the decrypted scrambler seed to generate read data; determine cyclic redundancy code (CRC) data for the read data; and transfer the read data to a host via the communication interface when the decrypted LBA matches the CRC data.

In Example 5, the subject matter of Example 4 optionally includes a memory control unit configured to generate CRC data for the received block of data and scrambling the CRC data using the scrambler seed; descramble the CRC data using the decrypted scrambler seed; and send the read data to the host when the descrambled CRC data is correct.

In Example 6, the subject matter of one or both of Examples 4 and 5 optionally include a memory control unit that includes parity check circuitry configured to perform a low-density parity check (LDPC) on the scrambled block of data during decrypting of the read encrypted LBA and scrambler seed.

In Example 7, the subject matter of one or any combination of Examples 1-6 optionally includes a memory control unit configured to initiate reading the scrambled block of data and encrypted LBA and scrambler seed from the memory array; decrypt the read encrypted LBA and scrambler seed using the changed encryption key when the erase command is received; descramble the scrambled block of data using a scrambler seed decrypted using the changed encryption key to generate incorrect read data; and communicate a fault via the communication interface in response to generating incorrect read data.

In Example 8, the subject matter of Example 7 optionally includes a CRC circuit configured to determine CRC data for read data; and a memory control unit configured to communicate a fault via the communication interface in response to a mismatch between the decrypted LBA and the CRC data.

In Example 9, the subject matter of Example 8 optionally includes a memory control unit is configured to send all zeros data via the communication interface in response to a mismatch between the decrypted LBA and the CRC data.

In Example 10, the subject matter of one or any combination of Examples 1-9 optionally includes a memory control unit configured to: generate a flash translation layer (FTL) to map the LBA to a physical address (PA); encrypt the PA in the FTL using the encryption key; and decrypt the FTL using the changed encryption key when the erase command is received.

Example 11 includes subject matter (such as a method of programming multi-level memory cells of a memory array), or can optionally be combined with one or any combination of Examples 1-10 to include such subject matter comprising: receiving a block of data to be written to a portion of a memory array of the memory device; generating a logical block address (LBA) for the block of data and a scrambler seed; scrambling the block of data using the scrambler seed; encrypting the scrambler seed and the LBA using an encryption key; writing a scrambled block of data and encrypted LBA and scrambler seed to the memory array; receiving an erase command to erase the block of data; and changing the encryption key in response to the erase command.

In Example 12, the subject matter of Example 11 optionally includes generating the encryption key for the block of data; storing the encryption key in association with the block of data; and wherein changing the encryption key includes overwriting the stored encryption key with a new encryption key in response to the erase command.

In Example 13, the subject matter of one or both of Examples 11 and 12 optionally includes scrambling the block of data using an unencrypted scrambler seed in parallel with encrypting the scrambler seed and LBA.

In Example 14, the subject matter of Example 13 optionally includes queuing unencrypted scrambler seed and data block pairs for data scrambling using a scrambler engine; and queuing LBA and scrambler seed pairs for encryption using an encryption engine in parallel to the data scramble.

In Example 15, the subject matter of one or any combination of Examples 11-14 optionally includes reading the scrambled block of data and encrypted LBA and scrambler seed from the memory array; decrypting the read encrypted LBA and scrambler seed; descrambling the scrambled block of data using the decrypted scrambler seed to generate read data; sending the read data to a host when the scrambled block of data is descrambled using a scrambler seed decrypted using a correct encryption key; and communicating a fault to the host when the scrambled block of data is descrambled using a scrambler seed decrypted using the changed encryption key.

In Example 16, the subject matter of Example 15 optionally includes generating CRC data for the received block of data to be written, wherein scrambling the block of data includes scrambling the CRC data and descrambling the data includes descrambling the CRC data; sending the read data to the host when the descrambled CRC data is correct; and communicating the fault to the host when the descrambled CRC data is incorrect.

In Example 17, the subject matter of one or both of Examples 15 and 16 optionally include sending all zeros data to the host as the read data when the read encrypted LBA is decrypted using the changed encryption key.

In Example 18, the subject matter of one or any combination of Examples 11-17 optionally includes creating a flash translation layer (FTL) that maps the LBA to a physical address (PA); encrypting the PA in the FTL using the encryption key; and decrypting the PA using the changed encryption key in response to the erase command.

Example 19 includes subject matter (such as a memory device) or can optionally be combined with one or any combination of Examples 1-18 to include such subject matter, comprising a memory array including memory cells; a communication interface; and a memory control unit operatively coupled to the memory array and the communication interface. The memory control unit is configured to: generate a logical block address (LBA) and cyclic redundancy code (CRC) data for a block of write data received via the communication interface; encrypt the LBA and CRC data using an encryption key; initiate writing encrypted LBA and CRC data to the memory array; and change the encryption key in response to an erase command received via the communication interface.

In Example 20, the subject matter of Example 19 optionally includes a memory control unit configured to generate the encryption key for the block of data; store the encryption key in association with the block of data; and overwrite the stored encryption key with a new encryption key in response to the erase command.

In Example 21, the subject matter of one or both of Examples 19 and 20 optionally includes a memory control unit configured to read the block of data, encrypted LBA, and encrypted CRC from the memory array; decrypt the read encrypted LBA and CRC data; send the read data to a host when the LBA and CRC are decrypted using a correct encryption key; and send all zeros data to the host when the LBA and CRC are decrypted using the changed encryption key.

In Example 22, the subject matter of one or any combination of Examples 19-21 optionally includes a memory control unit configured to generate a map that translates LBAs of a logical unit (LUN) of the memory array to physical addresses (PAs) of the memory array; and encrypt the map using the encryption key; and decrypting the map using the changed encryption key in response to the erase command.

These non-limiting examples can be combined in any permutation or combination. The above description is intended to be illustrative, and not restrictive. For example, the above-described examples (or one or more aspects thereof) may be used in combination with each other. Other embodiments can be used, such as by one of ordinary skill in the art upon reviewing the above description. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

The invention claimed is:

1. A memory control unit of a memory device, the memory control unit comprising:
   at least one hardware processor; and
   memory storing instructions that cause the at least one hardware processor to perform operations comprising:
   generating a scrambler seed and a logical block address (LBA) for a block of write data received by the memory control unit from a host device;
   generating a flash translation layer (FTL) to map the LBA to a physical address (PA);
   scrambling the block of data using the scrambler seed;
   encrypting the scrambler seed, the LBA, and the PA in the FTL using an encryption key;
   initiating writing a scrambled block of data and encrypted LBA and scrambler seed to a memory array; and
   decrypting the FTL using an incorrect encryption key in response to an erase command received by the memory control unit from the host device.

2. The memory control unit of claim 1, wherein the instructions cause the at least one hardware processor to generate a memory fault in response to a memory read request, wherein the memory read request accesses memory data descrambled using an incorrect scrambler seed decrypted using the incorrect encryption key.

3. The memory control unit of claim 1, wherein the instructions cause the at least one hardware processor to:
   generate the encryption key for the block of data;
   store the encryption key in association with the block of data; and
   overwrite the stored encryption key with the incorrect encryption key in response to the erase command.

4. The memory control unit of claim 1, wherein the instructions cause the at least one hardware processor to scramble the block of data using an unencrypted scrambler seed in parallel with encrypting the scrambler seed and LBA.

5. The memory control unit of claim 1, wherein the instructions cause the at least one hardware processor to:
   queue unencrypted scrambler seed and data block pairs for data scrambling using a scrambler engine of the memory device; and
   queue LBA and scrambler seed pairs for encryption using an encryption engine of the memory device in parallel to the data scramble.

6. The memory control unit of claim 1, wherein the instructions cause the at least one hardware processor to:

read the scrambled block of data and encrypted LBA and scrambler seed from the memory array;
decrypt the read encrypted LBA and scrambler seed;
descramble the scrambled block of data using the decrypted scrambler seed to generate read data;
send the read data to a host when the scrambled block of data is descrambled using a scrambler seed decrypted using the encryption key; and
communicate a fault to the host device when the scrambled block of data is descrambled using a scrambler seed decrypted using the incorrect encryption key.

7. The memory control unit of claim 6, wherein the instructions cause the at least one hardware processor to:
generate CRC data for the received block of data to be written;
scramble the CRC data using the scrambler seed;
descramble the CRC data;
sending the read data to the host when the descrambled CRC data is correct; and
communicating the fault to the host when the descrambled CRC data is incorrect.

8. The memory control unit of claim 6, wherein the instructions cause the at least one hardware processor to send all zeros data to the host as the read data when the read encrypted LBA is decrypted using the incorrect encryption key.

9. The memory control unit of claim 1, wherein the instructions cause the at least one hardware processor to:
stage user data for a memory write operation; and
stage LBA and scrambler seed pairs for one or both of an encryption engine and a decryption engine of the memory control unit in parallel with the staging of the user data.

10. A method of operating a memory device, the method comprising:
receiving a block of data to be written to a portion of a memory array of the memory device;
generating a logical block address (LBA) and cyclic redundancy code (CRC) data for a block of write data received by the memory device from a separate device;
generating a map that translates LBAs of a logical unit (LUN) of the memory array to physical addresses (PAs) of the memory array;
encrypting the LBA and CRC data and the map using a first encryption key;
initiating writing encrypted LBA and CRC data to the memory array; and
decrypting the map using an incorrect encryption key in response to an erase command received by the memory device.

11. The method of claim 10, including:
generating the first encryption key for the block of data;
storing the first encryption key in association with the block of data; and
overwriting the stored first encryption key with the incorrect encryption key in response to the erase command.

12. The method of claim 10, including:
reading the block of data, encrypted LBA, and encrypted CRC from the memory array;
decrypting the read encrypted LBA and CRC data;
sending the read data to a host when the LBA and CRC are decrypted using the first encryption key; and
sending all zeros data to the host when the LBA and CRC are decrypted using the incorrect encryption key.

13. The method of claim 10, including:
reading the block of data, encrypted LBA, and encrypted CRC from the memory array;
decrypting the read encrypted LBA and CRC data;
sending the read data to a host when the LBA and CRC are decrypted using the first encryption key; and
sending incorrect read data and a memory fault to the host when the LBA and CRC are decrypted using the incorrect encryption key.

14. The method of claim 10, including:
scrambling the block of data and the CRC using a scrambler seed;
encrypting the scrambler seed using the first encryption key;
decrypting the scrambler seed using the incorrect encryption key in response to the erase command.

15. The method of claim 10, wherein scrambling the block of data and CRC includes scrambling the block of data and the CRC using a scrambler seed including a random number and a memory page number.

16. The method of claim 10, wherein scrambling the block of data and CRC includes:
scrambling the block of data and the CRC and encrypting the scrambler seed in parallel with the scrambling; and
storing the encrypted LBA of the LUN, encrypted CRC, and encrypted scrambler seed in association with the scrambled block of data.

17. The method of claim 10, including building a new map to translate the LBAs of the LUN to the PAs subsequent to the erase command.

18. A memory system comprising:
means for receiving a block of data to be written to a portion of a memory array of the memory system;
means for generating a logical block address (LBA) for the block of data and a scrambler seed;
means for creating a flash translation layer (FTL) that maps the LBA to a physical address (PA);
means for scrambling the block of data using the scrambler seed;
means for encrypting the scrambler seed, the LBA, and the PA in the FTL using a first encryption key;
means for writing a scrambled block of data and encrypted LBA and scrambler seed to the memory array;
means for receiving an erase command to erase the block of data of the memory array; and
means for decrypting the PA using an incorrect encryption key in response to the erase command.

19. The memory system of claim 18, including:
means for generating the encryption key for the block of data;
means for storing the first encryption key in association with the block of data; and
means for overwriting the stored encryption key with the incorrect encryption key in response to the erase command.

20. The memory system of claim 18, including means for scrambling the block of data in parallel with encrypting the scrambler seed and the LBA.

* * * * *